United States Patent [19]
Scully et al.

[11] Patent Number: 5,257,645
[45] Date of Patent: Nov. 2, 1993

[54] CONCEALED FAUCET HANDLE MOUNTING

[75] Inventors: Larry J. Scully, Elyria; Richard A. Parso, Brunswick, both of Ohio

[73] Assignee: Moen Incorporated, Elyria, Ohio

[21] Appl. No.: 18,295

[22] Filed: Feb. 16, 1993

[51] Int. Cl.[5] .......................... F16L 5/00; F16K 31/60
[52] U.S. Cl. ...................................... 137/359; 251/293
[58] Field of Search ...................... 137/359, 360, 801; 251/291, 293

[56] References Cited

U.S. PATENT DOCUMENTS

| | | | |
|---|---|---|---|
| 1,055,646 | 3/1913 | Mossberg | 137/359 X |
| 1,605,457 | 11/1926 | Muend | 137/359 X |
| 1,654,550 | 1/1938 | Muend | 137/359 |
| 2,355,736 | 8/1944 | Klein | 137/359 |
| 2,966,924 | 1/1961 | Young | 137/359 |
| 3,026,898 | 3/1962 | Weller | 137/359 |
| 4,662,389 | 5/1987 | Igbal | 137/359 |
| 4,739,788 | 4/1988 | Reback | 137/359 X |
| 4,842,009 | 6/1989 | Reback | 137/359 X |
| 4,961,443 | 10/1990 | Buccicone et al. | 137/359 X |
| 5,031,877 | 7/1991 | Mercer | 137/359 |

FOREIGN PATENT DOCUMENTS

| | | | |
|---|---|---|---|
| 967069 | 9/1957 | Fed. Rep. of Germany | 137/359 |
| 1235088 | 2/1967 | Fed. Rep. of Germany | 137/359 |
| 1283173 | 11/1968 | Fed. Rep. of Germany | 137/359 |

*Primary Examiner*—John Rivell
*Attorney, Agent, or Firm*—Kinzer, Plyer, Dorn, McEachran & Jambor

[57] ABSTRACT

A faucet handle assembly for concealed attachment to a valve operating stem includes a handle and a handle adapter which is attached to it. There is a valve body which holds a valve member which has a valve stem extending outwardly therefrom into the handle adapter for attachment thereto. There is an exterior hub which is attached adjacent one end thereof to the valve body. The hub has interlocking means with the handle and handle adapter which prevent relative longitudinal movement between these elements but provides for rotary movement of the handle relative to the hub. There is a bearing positioned between facing surfaces of the handle and hub to provide for smooth rotation therebetween.

15 Claims, 2 Drawing Sheets

CONCEALED FAUCET HANDLE MOUNTING

BACKGROUND OF THE INVENTION

The present invention relates to a faucet handle assembly in which the attachment of the handle to the faucet operating valve is concealed. This is done both to prevent vandalism and to improve the decorative appearance of the handle assembly.

U.S. Pat. Nos. 4,306,468 and 4,961,443 are typical of faucet handle assemblies in which the operating valve attachment is concealed.

The present invention is particularly advantageous in that not only does it provide for a concealed attachment, but also provides an assembly in which the handle and hub decorative configuration, as well as an escutcheon configuration if used, may be changed to provide different decorative faucet styles.

SUMMARY OF THE INVENTION

The present invention relates to faucet handle assemblies having a concealed attachment between the handle and the faucet valve operating stem.

A primary purpose of the invention is a simply constructed reliable faucet handle assembly providing a concealed attachment to the valve operating stem.

Another purpose is a faucet handle assembly as described in which the handle and the other exterior components of the assembly may be changed to provide different decorative styles, but yet maintaining the basic attachment configuration.

Another purpose is a faucet handle assembly as described utilizing slip-fit splines to account for rough-in thickness variations in the faucet mounting.

Another purpose is a faucet handle assembly as described which may be used with a variety of different faucets, tub/shower and roman tub applications.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Although the present invention will be specifically described in connection with faucet handle assemblies, it should be understood that that terminology is meant to include shower/tub control valves which are broadly considered to be faucet handle assemblies, as well as the type of handle assembly commonly used on what is known as a "roman" tub. The invention particularly pertains to the means of attaching the handle to the underlying valve stem which conceals this attachment and also permits the interchange of the handle and other decorative exterior parts to provide different decorative styles.

Figure 1:
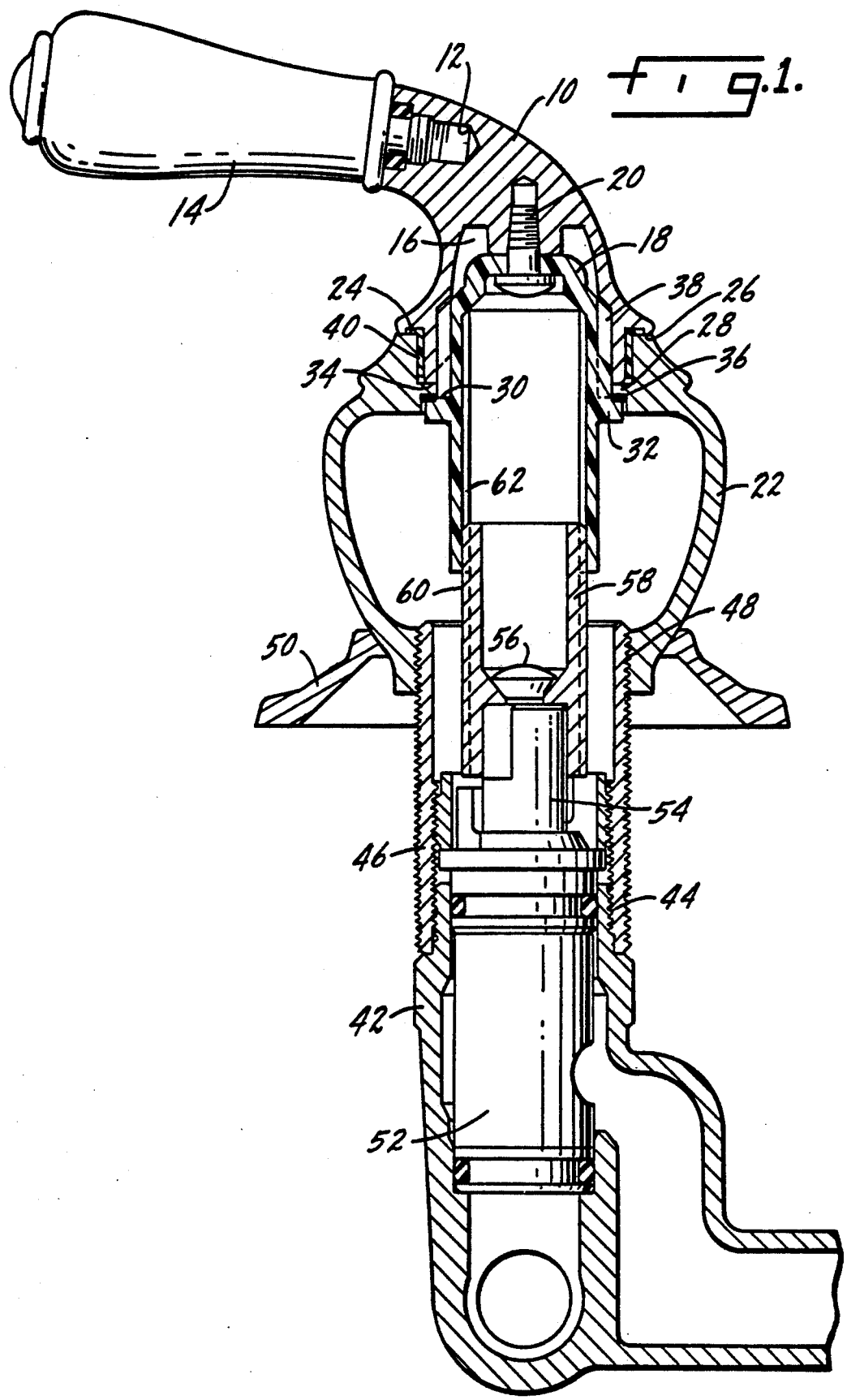
FIG. 1 is a vertical section through a first embodiment of faucet handle assembly.

In FIG. 1 a handle elbow is indicated at 10 and it may have a bore 12 for use in fastening an operating handle 14. The elbow 10 has a curved exterior and an interior chamber 16 within which is positioned a handle adapter 18. The adapter 18 is attached by a threaded fastener 20 to the elbow 10.

An exterior decorative hub is indicated at 22 and has an upwardly-facing surface 24 which is in contact with a lower facing surface 26 of the elbow such that when these elements are assembled, they provide a continuous ornamental exterior for the faucet handle assembly.

Hub 22 has an inwardly-extending projection 28 which is held between an upwardly-facing surface 30 on an outwardly-extending projection 32 of the handle adapter and a lower facing surface 34 on a portion of the elbow 10. In order to accommodate tolerances between the elements, a spring element, for example a wave washer 36, may be positioned between the bottom of inwardly-directed projection 28 and on top of upwardly-facing surface 30 of the handle adapter.

The elbow and handle adapter are further interlocked by a mating spline connection indicated at 38, there being a series of uniformly circumferentially arranged splines on the exterior of the handle adapter and the interior of the elbow so that these two elements will rotate together.

The handle and handle adapter rotate relative to the hub. A bearing 40 is positioned between facing surfaces of the hub and elbow so as to provide for smooth rotation between these elements.

A valve body is indicated at 42 and it may have an exterior thread 44 which mounts a valve body extender 46. The valve body extender 46 is threadedly attached to the lower end of hub 22, as at 48. A decorative escutcheon 50 may surround the lower end of the hub and covers up the threaded connection between the hub and valve body extender 46. The escutcheon will be held firmly upon the sink deck by downward pressure from the hub when it is threadedly attached to the valve body extender.

Positioned within valve body 42 is a valve cartridge 52 having a valve operating stem 54. The valve cartridge may be of the type sold by the assignee of the applicant herein, Moen Incorporated, under the trademark "1224". The valve operating stem 54 is attached by a threaded fastener 56 to a stem extension 58. The stem extension has an exterior spline configuration 60 which mates with an interior spline configuration 62 on the handle adapter. Spline connections of this type are useful in that they accommodate variations in the dimensions between the mounting of the valve body and the location of the shower wall and/or tub/sink deck which the escutcheon and hub are resting upon.

To assemble the faucet elements described, the handle 14 is first threaded into the elbow 10. The handle adapter 18 is then used to attach hub 22 to the elbow and handle by means of fastener 20. Although these elements are attached, the hub is rotatable relative to the handle. The hub 22 is then screwthreaded onto the valve body extender 46 and in so doing will apply downward locating pressure on the escutcheon 50 to locate it relative to the shower wall and/or tub/sink deck upon which the assembly is positioned. The spline connections between the stem extension and handle adapter provide for variations in position as described earlier. Prior to the assembly of the hub upon the valve body, the stem extension will be screwthreaded onto the stem of the valve cartridge. Once so assembled, all connections between the elements are concealed. This limits vandalism and more importantly provides an exterior surface which shows no visible connection between the elements. Because of the manner in which the elements are interconnected the handle, elbow and hub all may have different exterior configurations to provide faucets of different decorative styles.

Figure 2:
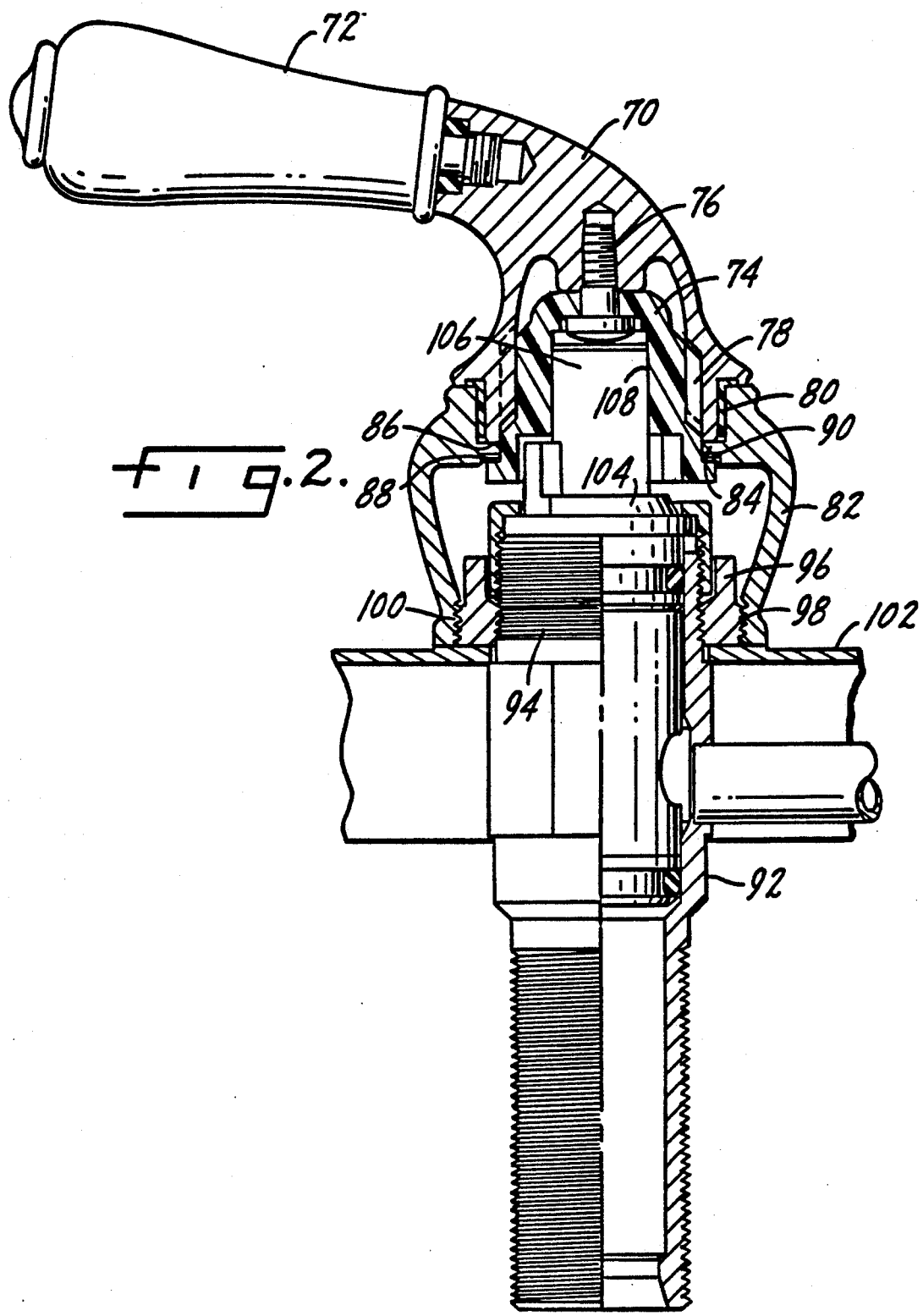
FIG. 2 is a vertical section through a second embodiment of faucet handle assembly.

In the embodiment of FIG. 2 there is an elbow 70 which has attached thereto a handle 72. A handle adapter 74 is attached by a fastener 76 to the elbow 70. There is a spline connection 78 between the handle adapter and the elbow. A bearing 80 is positioned between opposing surfaces of a hub 82 and the elbow 70. Again, the hub may have an inwardly-directed projection 84 which is held between a downwardly-facing surface 86 on the elbow and an upwardly-facing surface 88 on the handle adapter. A spring element or wave washer 90 may be positioned between the projection and the handle adapter as described in connection with the FIG. 1 embodiment.

In the embodiment of FIG. 2, the valve body which is indicated at 92 has an exterior thread 94 by which a mounting nut 96 is attached thereto, securing escutcheon 102 to valve body 92. Nut 96 has an exterior thread 98 which mates with the interior thread 100 on the lower end of the hub whereby the hub may be mounted to the valve body on top of the escutcheon indicated at 102.

Extending outwardly from the valve body 92 is a valve operating cartridge 104 having a stem 106. The exterior configuration of the stem mates with the interior configuration of the handle adapter, as indicated at 108 so that these elements are arranged for concurrent rotation. The spline connection between the stem extension and the interior of the handle adapter provides the same function as in the FIG. 1 embodiment.

The assembly of the elements in the FIG. 2 embodiment is similar to that in FIG. 1 except that the nut 96 is used as the threaded connection between the exterior of the valve body and the interior threaded portion of hub 82. As was true in the FIG. 1 embodiment, the handle, elbow and hub of the FIG. 2 embodiment may be changed to provide a different exterior appearance and all of the connections between the various elements are hidden.

Whereas the preferred form of the invention has been shown and described herein, it should be realized that there may be many modifications, substitutions and alterations thereto.

The embodiments of the invention in which an exclusive property or privilege is claimed are defined as follows:

1. A faucet handle assembly for concealed attachment to a valve operating stem including a handle, a handle adapter attached to said handle, a valve body and a valve member positioned therein and having a valve operating stem extending outwardly therefrom, means for securing said handle adapter to said valve operating stem for concurrent rotation, an exterior hub attached adjacent one end thereof to said valve body, cooperating means on said handle adapter, hub and handle for attaching said hub to said handle while providing for rotation of said handle relative to said hub, said cooperating means including yielding means positioned between facing surfaces of said hub and one of said handle adapter and handle.

2. The faucet handle assembly of claim 1 further characterized by and including a bearing between facing surfaces of said handle and hub to provide for relative rotation therebetween.

3. The faucet handle assembly of claim 1 further characterized in that said cooperating means include an inwardly directed projection on said hub which is positioned between facing surfaces of said handle adapter and handle.

4. The faucet handle assembly of claim 3 further characterized by and including spring means between said projection and one of said facing surfaces.

5. The faucet handle assembly of claim 3 further characterized in that said handle has a lower peripheral surface on the upper side of said inwardly directed projection and said handle adapter has an upwardly facing surface on the lower side of said inwardly directed projection, with said projection and the surfaces on opposite sides thereof interlocking said hub to said handle and handle adapter 6. The faucet handle assembly of claim 1 further characterized in that said handle adapter is mounted to said handle by a threaded member.

7. The faucet handle assembly of claim 1 further characterized in that said hub has a threaded mounting connection to said valve body.

8. The faucet handle assembly of claim 7 further characterized by and including a threaded nut having an exterior thread for attachment to said hub and an interior thread for attachment to said valve body.

9. The faucet assembly of claim 1 further characterized in that the interior of said handle adapter has a configuration which mates and interlocks with the exterior of said valve operating stem.

10. The faucet assembly of claim 1 further characterized by and including an interior sleeve interlocked with said handle adapter and attached to said valve operating stem.

11. The faucet assembly of claim 1 further characterized by and including an escutcheon extending at least in part about said hub and adapted to overlie a sink deck.

12. A faucet handle assembly for concealed attachment to a valve stem including a handle, a handle adapter having a concealed attachment to said handle, a valve body and a valve member positioned therein and having a valve stem extending outwardly therefrom, means for attaching said handle adapter to said valve stem for concurrent rotation, an exterior hub having an interior connection to said valve body, said handle adapter having an upwardly facing surface thereon, said handle having a downwardly facing surface thereon, said hub having an inwardly directed projection extending between said surface to prevent longitudinal movement of said hub relative to said handle and handle adapter, spring means between said hub projection and one of said facing surfaces, and a bearing between said hub and handle to provide for rotation of said handle relative to said hub.

13. The faucet handle assembly of claim 12 further characterized in that said exterior hub has a threaded connection, at the bottom end thereof, to said valve body.

14. The faucet handle assembly of claim 12 further characterized in that said handle adapter is attached to said handle by a concealed threaded connection.

15. The faucet handle assembly of claim 12 further characterized in that the means for attaching the handle adapter to the valve stem provides for axial adjustment therebetween.

* * * * *